US006183909B1

(12) United States Patent
Maeda et al.

(10) Patent No.: US 6,183,909 B1
(45) Date of Patent: Feb. 6, 2001

(54) ALKALINE STORAGE BATTERY

(75) Inventors: Akihiro Maeda, Kobe; Hirokazu Kimiya, Kyoto; Yoshio Moriwaki, Hirakata; Isao Matsumoto, Osaka, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/070,738

(22) Filed: May 1, 1998

(30) Foreign Application Priority Data

May 30, 1997 (JP) .................................................. 9-141937

(51) Int. Cl.⁷ ....................................................... H01M 4/32
(52) U.S. Cl. ............................ 429/223; 429/224; 423/594
(58) Field of Search .................... 429/223, 224; 423/594

(56) References Cited

U.S. PATENT DOCUMENTS

| 4,946,646 | 8/1990 | Gamo et al. | 420/415 |
| 5,523,182 | 6/1996 | Ovshinsky et al. | 429/223 |
| 5,674,643 | * 10/1997 | Yano et al. | 429/223 |
| 5,702,762 | * 12/1997 | Baba et al. | 427/212 |

FOREIGN PATENT DOCUMENTS

| 0727834 | 8/1996 | (EP) . |
| 0757395 | 2/1997 | (EP) . |
| 8148145 | 6/1996 | (JP) . |
| 8148146 | 6/1996 | (JP) . |
| 8236110 | 9/1996 | (JP) . |

OTHER PUBLICATIONS

European Search Report dated Sep. 22, 1998.

* cited by examiner

*Primary Examiner*—Ngoclan Mai
(74) *Attorney, Agent, or Firm*—Stevens, Davis, Miller & Mosher, L.L.P.

(57) ABSTRACT

A high energy density alkaline storage battery which uses a positive electrode including mainly nickel oxide is provided by increasing the capacities of the positive electrode and negative electrode. For increasing the capacity density of the positive electrode, the active material is incorporated as a solid solution with at least one element selected from manganese, chromium, aluminum and calcium in the range of from not less than 3 mol % to not more than 15 mol % relative to the active material, and the surface and/or the neighborhood of the surface of the active material are coated with a cobalt oxyhydroxide having a high electric conductivity of a specific resistance of 15 Ω·cm or less and a low crystallinity.

8 Claims, 1 Drawing Sheet

ALKALINE STORAGE BATTERY

BACKGROUND OF THE INVENTION

1. Field of the Invention

The present invention relates to an alkaline storage battery using nickel oxide for the positive electrode, and can be applied to nickel-metal hydride storage batteries using a hydrogen-absorbing alloy for the negative electrode and nickel-cadmium storage batteries using cadmium for the negative electrode. The invention particularly relates to a technique for obtaining batteries with enhanced capacity.

2. Description of the Related Art

In recent years, with the widespread use of portable appliances, the demand for small-sized secondary batteries is increasing. Among them, alkaline storage batteries which use nickel oxides for the positive electrode and an aqueous alkaline solution as the electrolyte have been much in demand because of their advantages of low cost, high energy density and stoutness.

Of these batteries, the nickel-metal hydride storage battery has acquired a still more enhanced capacity as compared with the nickel-cadmium storage battery by using for the negative electrode hydrogen absorbing alloys capable of absorbing and releasing hydrogen electrochemically. The alkaline storage batteries, that is, nickel-metal hydride storage batteries and nickel-cadmium storage batteries, are much expected as a battery which can meet a wide range of uses extending from the use for small-sized portable appliances to that for large-sized electric automobiles. In particular, increasing the energy density of batteries, which makes it possible to attain batteries with smaller size and lighter weight, is eagerly required in the market. Prior main techniques used in regard to increasing the energy density of batteries in the above-mentioned battery system are described below.

Nickel hydroxide used as the positive electrode active material of alkaline storage batteries inherently has a very low electric conductivity, but it is converted to a trivalent nickel oxyhydroxide having a somewhat higher conductivity by charging. At the last stage of discharge, however, the content of divalent nickel hydroxide in the active material particles increases and the conductivity of the active material decreases; resultantly, the overvoltage increases and the discharge voltage decreases sharply.

It is already known that, to suppress the above-mentioned phenomenon, an additive comprising mainly cobalt oxide is added to the positive electrode to form on the surface of the nickel hydroxide active material trivalent cobalt oxyhydroxide having a higher effect in increasing the conductivity and thereby to give a high conductivity to the active material as a whole and suppress the above-mentioned increase of overvoltage. This method has made it possible to raise the utilization rate of the active material to 100%.

Further, to improve the utilization rate of the active material still more, as disclosed for example in JP-A-8-148145 and JP-A-8-148146, a method of adding a cobalt compound which has a higher conductivity than previous additives has been proposed.

On the other hand, the improvement of the active material itself to attain a higher capacity has also advanced; as disclosed in JP-A-8-236110, attempts have been made to improve the utilization rate by incorporating manganese, chromium, aluminum, etc. as solid solution into the active material particles comprising mainly nickel oxide. Whereas ordinary nickel hydroxide is changed into β-type nickel oxyhydroxide by charging, the above-mentioned method intends, by the incorporation of manganese, etc. into the active material as a solid solution, to form γ-type nickel oxyhydroxide positively, the formation of which has been apprehended in the prior techniques.

Thus, in contrast to β-type nickel oxyhydroxide, γ-type nickel oxyhydroxide has a large specific volume, hence causes the swelling of the positive electrode plate, and moreover exhibits a fairly low discharge voltage. Therefore, it has been considered important to suppress the formation of γ-type nickel oxyhydroxide to as low a level as possible. Consequently, attempts have been made, for the purpose of suppressing the formation of γ-type nickel oxyhydroxide, to add zinc oxide or the like as an additive to the positive electrode or as a material to be incorporated into the active material to form a solid solution.

However, a recent technique which incorporates manganese into active material particles to form a solid solution has made it possible to raise the discharge voltage of γ-type nickel oxyhydroxide, which has been considered to discharge with difficulty, to the same level as the discharge voltage of β-type nickel oxyhydroxide. Accordingly, there has recently been a trend to positively utilize the γ-type nickel oxyhydroxide for attaining a higher capacity of batteries.

Though it is generally said that the nickel in the γ-type nickel oxyhydroxide in the charged stage assumes an oxidation number of trivalences or more and less than tetravalences, it can be considered that the oxidation number varies somewhat depending on the manners in which alkaline cations and water molecules are incorporated into the interlayer spaces of the nickel oxyhydroxide crystals and in general the oxidation number seems to be a value of about 3.5-valences.

On the other hand, the nickel in the β-type nickel hydroxide in the discharged state is in the divalent state, so that it is considered that in the charge-discharge reaction between the γ-type nickel oxyhydroxide and the β-type nickel hydroxide, 1.5 electrons can move at the maximum per nickel atom. That is to say, whereas the nickel in the prior β-type nickel oxyhydroxide is trivalent and hence one electron moves at the maximum per nickel atom, the γ-type nickel oxyhydroxide has the potential capability to raise the utilization rate of nickel oxide to about 150%.

Separately, it has already been proposed in U.S. Pat. No. 5,523,182 to use an active material comprising a nickel hydroxide active material and at least three compositional modifiers selected from the group consisting of Al, Bi, Co, Cr, Cu, Fe, In, La, Mn, Ru, Sb, Ti and Zn and at least one chemical modifier selected from the group consisting of Al, Ba, Ca, Co, Cr, Cu, F, Fe, K, Li, Mg, Mn, Na, Sr and Zn thereby to form a cobalt compound on the surface of the active material particles and to form a cobalt capsule layer on the surface at the time of the first charging.

As to the negative electrode, $AB_5$ type hydrogen absorbing alloys comprising mainly rare earth metals-nickel have heretofore been in wide use but, in place thereof, hydrogen absorbing alloys composed mainly of $AB_2$ type C14 or C15 Laves phase comprising zirconium and nickel as the main components are attracting attention because of their advantage of high capacity.

However, these techniques for increasing the capacity hitherto proposed are still unsatisfactory for attaining a high capacity in the above-mentioned battery system.

For example, in the method of adding a cobalt compound disclosed in JP-A-8-148145 and JP-A-8-148146, the utilization rate of the active material reaches its upper limit at about 110% and no more improvement in the utilization rate can be expected. This leads also to an unsatisfactory result in attaining a high capacity of the battery as a whole.

In the method of incorporating manganese and zinc into the active material as a solid solution disclosed in JP-A-8-236110, wherein an element which suppresses the formation of γ-type nickel oxyhydroxide, such as zinc, is contained as a solid solution in the active material, the formation of γ-type nickel oxyhydroxide is suppressed and the utilization rate attainable is about 110% at the most also in this case. Thus, the material obtained by this method is still unsatisfactory for attaining a high capacity.

Separately, when the technique disclosed in U.S. Pat. No. 5,523,182 is used, owing to the expansion of the active material caused by the formation of γ-type nickel oxyhydroxide, the network of cobalt oxyhydroxide is broken and the efficiency of electronic conduction between active material particles or between the active material and the core material is lowered, and hence a sufficient utilization rate is difficult to obtain. Moreover, owing to the above-mentioned influence on the conductivity between the active material particles and between the active material and the core material caused by the breakage of the cobalt oxyhydroxide network as well as owing to the lowering of conductivity of the active material itself, the overvoltage rises sharply at the last stage of discharge, and nickel is reduced only to a state of 2.1-valences or higher. Thus, the active material cannot fully exhibit its potential capacity.

Furthermore, replacing the negative electrode material by a high-capacity hydrogen absorbing alloy composed mainly of $AB_2$ type C14 or C15 Laves phase is also still unsatisfactory for attaining a higher capacity of batteries.

In these nickel-metal hydride storage batteries which have the highest energy density among those actually available on the market at present, the occupied volumes of the constituent members relative to the total volume of the battery are: about 50% for the positive electrode, about 25% for the negative electrode and the remaining 25% for the separator, electrolyte and vacant space; thus the positive electrode occupies a larger volume than the negative electrode. What determines the battery capacity in the battery is the capacity of the positive electrode, and it is indispensable for increasing the battery capacity to increase the amount of the active material of the positive electrode or to improve the utilization rate of the positive electrode. Even if the capacity of the negative electrode, which is relatively small in volume, is markedly improved, the contribution of the improvement to attaining a high battery capacity is actually disappointedly small.

Therefore, for attaining a high capacity of these batteries, increasing the capacity of the positive electrode is the major prerequisite. If the capacity of the positive electrode can be further increased, the volume occupied by the positive electrode in the battery decreases, the occupied volume of the negative electrode can be increased and resultantly the increase of the capacity of the negative electrode becomes of more value. In the prior methods as disclosed in U.S. Pat. No. 4,946,646, their effect is confined to increasing the capacity of the negative electrode alone, and the above-mentioned effect of increasing the battery capacity as a whole by the increased capacity of the negative electrode is not satisfactorily exhibited.

The object of the present invention is, overcoming the above-mentioned difficulties, to provide an alkaline storage battery of a high capacity by selecting the optimum combination of (1) improving the utilization rate of the positive electrode active material itself as well as the electric conductivity between the positive electrode active material particles and between the active material and the core material, to suppress the rise of overvoltage at the last stage of discharge and to make it possible to take out more electricity, and (2) using a negative electrode material of a higher capacity to decrease the occupied volume of the negative electrode.

SUMMARY OF THE INVENTION

The present invention provides an alkaline storage battery which comprises a positive electrode comprising nickel oxide powder as the main active material, a negative electrode, a separator and an alkaline electrolyte, wherein the nickel oxide powder contains as a solid solution at least one element selected from the group consisting of manganese, aluminum, chromium and calcium and the surface and/or the neighborhood of the surface of the powder particles are coated with a material of high electric conductivity containing a cobalt oxyhydroxide having a low crystallinity and a specific resistance of 15 Ω·cm or less.

In a preferred embodiment of the present invention, an alloy composed mainly of the C14 or C15 type Laves phase comprising Zr and Ni as the main components may be used as the hydrogen absorbing alloy of the negative electrode. By combining the above-mentioned techniques, alkaline storage batteries with a higher capacity can be provided.

The present invention further provides a process for producing an alkaline storage battery wherein the nickel oxide powder of the alkaline storage battery is prepared first by synthesizing active material particles comprising a nickel oxide powder containing at least one element selected from the group consisting of manganese, aluminum, chromium and calcium as a solid solution and thereafter coating the above-mentioned high-conductivity cobalt oxyhydroxide on the surface of the active material particles by a method comprising applying a positive electrode additive comprising mainly divalent cobalt oxide to the surface and/or the neighborhood of the surface of the positive electrode active material particles comprising mainly nickel oxide by means of mechanical kneading or reaction-deposition, then adding a powder or an aqueous solution of at least one member selected from the hydroxides of sodium, potassium and lithium thereto, and then subjecting the resulting active material particles to an oxidation treatment in an oxidizing atmosphere at a temperature not lower than 80° C. and not higher than 120° C. In previous known methods, cobalt compounds having a specific resistance less than 100 Ω·cm could not be prepared owing to the absence of alkaline ions or insufficient oxidation, whereas in the process of the present invention, by conducting the alkaline oxidation treatment under the above-mentioned conditions, amorphous, high-conductivity cobalt oxyhydroxide having a conductivity improved to 15 Ω·cm or less can be obtained on the surface of the active material. By coating the surface of the active material particles which contain as a solid solution at least one element selected from the group consisting of manganese, aluminum, chromium and calcium and can react to the extent of about 1.5 electrons with the high conductivity cobalt oxyhydroxide, the electric conductivity of the active material is improved, the overvoltage attendant on charge and discharge is decreased, and charge and discharge can be conducted deeper than previously.

DETAILED DESCRIPTION OF THE INVENTION

Figure 1:
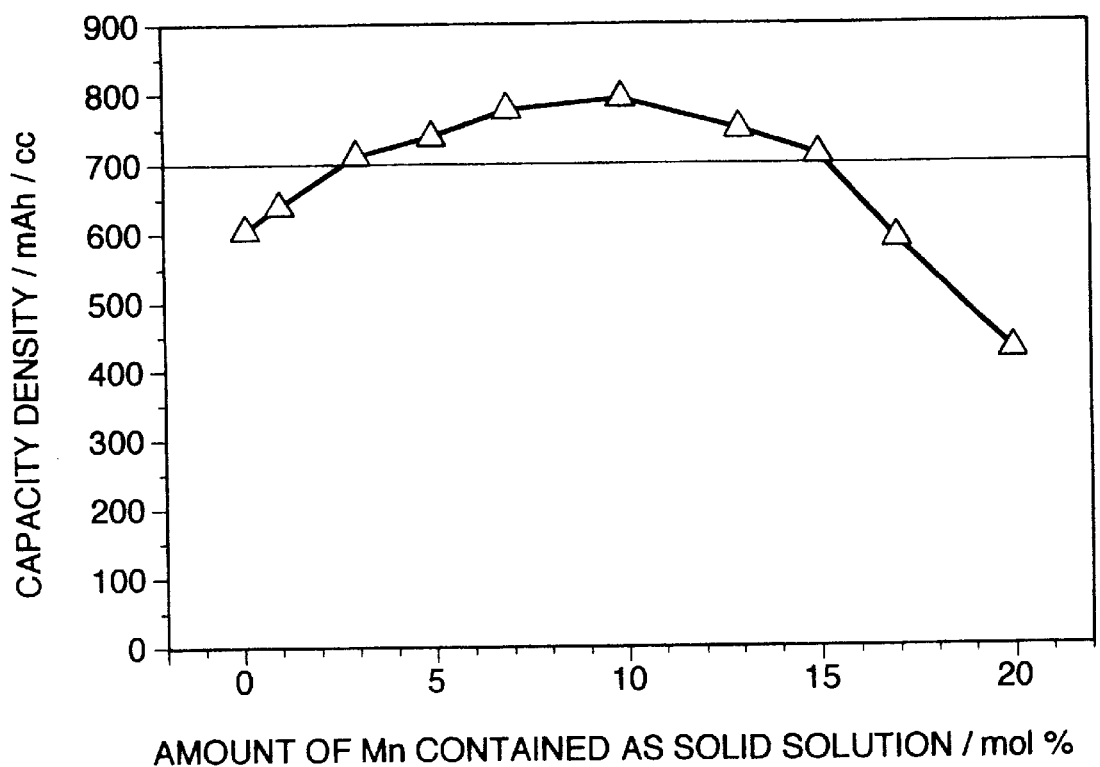
FIG. 1 is a graph showing the relation of the capacity density of the positive electrode vs. the amount of manganese contained as a solid solution in nickel hydroxide.

The aspect of the present invention described in claim 1 relates to an alkaline storage battery which comprises a positive electrode comprising mainly nickel oxide, a negative electrode, an alkaline electrolyte and a separator, wherein the nickel oxide contains as a solid solution at least one element selected from the group consisting of manganese, aluminum, chromium and calcium, cobalt oxide is applied to the surface of the nickel oxide by means of mechanical kneading or reaction-deposition and the cobalt oxide is converted to a cobalt oxide with a high electric conductivity and low crystallinity by an alkaline oxidation treatment. The above-mentioned procedures exert the effect of improving the electric conductivity between the active material particles and between the active material and the core material, whereby the utilization rate of the active material is improved remarkably and resultantly batteries with a higher capacity can be obtained.

As compared with the prior technique which merely comprises incorporating at least one element selected from the group consisting of manganese, aluminum, chromium and calcium into nickel oxide to form a solid solution, the technique of the present invention which comprises the combination of the technique of incorporating at least one element selected from the group consisting of manganese, aluminum, chromium and calcium into nickel oxide to form a solid solution and the technique of coating the surface and/or the neighborhood of the surface of the active material powder particles with a high conductivity material containing a cobalt oxyhydroxide of a specific resistance of 15 Ω·cm or less and a low crystallinity exerts the effect of improving the charge efficiency of the active material and the effect of forming a larger amount of γ-type nickel oxyhydroxide, which has a larger interlayer spacing than β-type nickel oxyhydroxide. Further, by virtue of the coating layer having a high conductivity, discharge can be conducted more deeply than previously. Thus, a positive electrode having a markedly higher capacity than before can be obtained.

The aspect of the present invention described in claim 4 relates to the use, as the negative electrode, of a hydrogen absorbing alloy which is composed mainly of the C14 or C15 Laves phase comprising Zr and Ni as the main components and additionally at least one element selected from the group consisting of Mg, Ca, Ti, Hf, La, V, Nb, Ta, Cr, Mo, W, Mn, Fe, Co, Cu, Al and Si replacing a part of Zr and/or Ni. The use of the above-mentioned alloy has the effect of decreasing the occupied volume of the negative electrode and thereby making it possible to use a larger-sized positive electrode. By using this technique in combination with the technique of attaining a higher capacity of the positive electrode, the beneficial effect of the improved negative electrode capacity can be more markedly exhibited as compared with the previous case wherein the negative electrode alone is improved.

EXAMPLES

The present invention is described in detail below with reference to Examples, but the invention is in no way limited thereto.

Example 1

First, the results of comparison of performances made with the battery of the present invention and a battery of the prior art are described below.

Cobalt hydroxide was applied to the surface of spherical nickel hydroxide (containing 10 mol % of manganese as a solid solution in $Ni(OH)_2$) having an average particle diameter of 30 μm, which was one of the active materials of the present invention, in a proportion of 7 g per 100 g of the spherical nickel hydroxide by means of reaction-deposition, and the resulting particles were washed with water and dried.

Then the particles were mixed with a sodium hydroxide powder having a particle diameter of 100 μm or less and subjected to an oxidation treatment by heating in the air at 110° C. The resulting mixture was then washed with water and dried to obtain a positive electrode active material mixture.

The positive electrode active material mixture was mixed with water and kneaded into the form of paste. The paste was filled into a foamed nickel porous plaque, then dried, pressed and cut to a predetermined size (39 mm×75 mm×0.7 mm) to obtain a positive electrode having a theoretical capacity of 1400 mAh calculated based on the one-electron reaction of Ni.

To prepare the hydrogen absorbing alloy of the negative electrode, an alloy having the Laves phase structure represented by the composition formula $Zr_{0.8}Ti_{0.2}Mn_{0.5}Mo_{0.05}Cr_{0.15}Co_{0.1}Ni_{1.2}$ obtained by weighing respective predetermined amounts of Zr, Ti, Ni, Mn, Cr, Co and Mo, followed by mixing, heating, melting and cooling was pulverized to an average particle diameter of 30 μm. The resulting alloy powder was kneaded with an aqueous solution of poly(vinyl alcohol) (PVA) of a binder into the form of paste. The paste was filled into a foamed nickel porous plaque, then pressed and cut to a predetermined size (39 mm×100 mm×0.3 mm thickness) to obtain a hydrogen absorbing alloy negative electrode.

The negative electrode was combined with the positive electrode obtained above and placed in a battery case. Then 2 ml of an electrolyte obtained by adding lithium hydroxide in a proportion of 40 g/l to an aqueous potassium hydroxide solution having a specific gravity of 1.30 was poured into the case, and the case opening was sealed to obtain a sealed nickel-metal hydride storage battery of the AA-size having a theoretical capacity of 1200 mAh, limited by the positive electrode capacity. The battery was referred to as the battery A of the Example of the present invention.

For comparison of performances with the battery A of the Example, a battery was prepared through the same steps as taken for the battery A of the present invention except that the oxidation treatment after application of cobalt hydroxide of the positive electrode was not conducted. This battery was referred to as the battery B of the Comparative Example.

Further, a battery was prepared through the same steps of preparation as taken for the battery A except that a positive electrode active material comprising nickel hydroxide which contains merely 1 mol % of cobalt and 3 mol % of zinc as a solid solution was used. The battery was referred to as the battery C of the Comparative Example.

The batteries A, B and C, after electrolyte-pouring and sealing, were respectively charged at 120 mA at a constant temperature of 20° C for 15 hours, and then discharged at 240 mA at the same temperature as above until the end voltage of 0.8 V was reached. This charge-discharge operation was repeated 5 times.

Then the batteries were respectively subjected to a charge-discharge test. At a constant temperature of 20° C., the battery was charged at 120 mA for 15 hours, then allowed to stand for 1 hour and discharged at 240 mA until the battery voltage reached 1.0 V, to determine the amount of electricity discharged, which was referred to as the standard discharge capacity. The batteries A, B and C were all designed such that the battery capacity was determined by the positive electrode capacity as in ordinary batteries.

Table 1 shows the result of the charge-discharge test in terms of the utilization rate of the positive electrode. The utilization rate was defined, as an index to the extent of discharge relative to the theoretical capacity, which was calculated based on the one-electron reaction of nickel, by the following equation.

Utilization rate (%)=(Discharge capacity/Theoretical capacity)×100

TABLE 1

|  | Utilization rate |
|---|---|
| Battery A | 142% |
| Battery B | 108% |
| Battery C | 105% |

As is apparent from Table 1, the battery A of the present invention shows a markedly high utilization rate. Thus, the superiority of the present invention could be confirmed.

As the reason for the above-mentioned improvement of the utilization rate, it can be considered that owing to the effect of cobalt oxide with a high electric conductivity and a low crystallinity coated on the surface of the active material, charging could be conducted more to a depth to form γ-type nickel oxyhydroxide efficiently, and owing further to the effect of manganese contained in the active material as a solid solution, the discharge voltage of γ-type nickel oxyhydroxide rose to a range wherein discharge was possible. When the battery in the discharged state was disassembled and the positive electrode material was examined by X-ray diffraction, it was observed that nickel hydroxide was present mainly as the β-type. This result was the same as that obtained by determination of the material before it was constructed into the electrode. In another experiment wherein the battery was disassembled in the charged state and examined in the same manner as above, it was observed that γ-type nickel oxyhydroxide was predominantly present and, additionally, β-type nickel oxyhydroxide was also present.

Then the battery A of the present invention was examined for other battery characteristics, that is, the discharge, life and storage characteristics in low-temperature high-rate discharge, repeated charge and discharge and high temperature storage in the charged state. It showed good performances in all of the tests.

Separately from the above-mentioned tests, the following test was conducted. A battery was prepared which was the same as the battery A except that in place of the negative electrode alloy used in the battery A mentioned above an alloy obtained by pulverizing an alloy which is an $MmNi_5$ type hydrogen absorbing alloy ($AB_5$ type; Mm means herein a mixture of rare earth group elements comprising La, Ce, Nd, Sm, etc.) represented by the composition formula $MmNi_{3.9}Mn_{0.3}Al_{0.3}Co_{0.5}$ to an average diameter of 30 μm was used for the negative electrode. However, at the initial stage of charging, owing to the deficiency of the negative electrode capacity, the oxygen gas evolved from the positive electrode and the hydrogen gas evolved from the negative electrode could not be recombined into water, and, as a result, the safety valve operated and the electrolyte went out of the battery case. Consequently, the battery could not be subjected to evaluation tests. Thus, it was confirmed that the $MmNi_5$ type alloy was deficient in capacity, from the design, to be used as the negative electrode of the battery A of the Example of the present invention, and it is necessary to increase the capacity of the negative electrode.

As another experiment, batteries were prepared which were of the same structure as that of the battery A except that in place of the negative electrode of the battery A of the present invention hydrogen absorbing alloys composed mainly of other Laves phase structure different in composition from the alloy of the battery A as shown in Table 2 were used. The batteries were subjected to the same tests as in the battery A.

TABLE 2

| Alloy | Composition |
|---|---|
| 1 | $Zr_{0.5}Ti_{0.2}Mn_{0.6}Mo_{0.06}Cr_{0.15}Co_{0.1}Ni_{1.2}$ |
| 2 | $Zr_{1.0}Ti_{1.2}Mn_{0.6}V_{0.1}Cr_{0.2}Co_{0.1}Ni_{1.3}$ |
| 3 | $Zr_{1.0}Ti_{0.2}Mn_{0.7}Mo_{0.1}Cr_{0.2}Ni_{1.3}$ |
| 4 | $Zr_{1.2}Mn_{0.6}V_{0.1}Cr_{0.2}Co_{0.1}Ni_{1.3}$ |

Resultantly, it was revealed that in the batteries prepared by using these alloys also, approximately the same good performances were obtained as in the above-mentioned battery A. Further, experiments similar to the above experiment were made by using alloys obtained by changing the composition ratio of Mo in the alloy 3 to 0.05 and further (1) adding 0.05, in terms of composition ratio, of Mg, Ca, La, Nb, Ta, W, Fe, Cu, Al and Si to yield 10 kinds of alloys, and (2) changing the composition ratio of Zr to 0.8 and adding 0.2, in terms of composition ratio, of Hf to give an alloy. It was revealed that approximately the same performances as those of the battery A of the present invention could be obtained.

Accordingly, it was confirmed that approximately the same results can be obtained when hydrogen absorbing alloys composed mainly of the C14 or C15 Laves phase comprising Zr and Ni as the main components and additionally at least one element selected from the group consisting of Mg, Ca, Ti, Hf, La, V, Nb, Ta, Cr, Mo, W, Mn, Fe, Co, Cu, Al and Si replacing a part of Zr and/or Ni were respectively used for the negative electrode.

Example 2

Batteries were prepared in the same manner as used for the battery A of Example 1 except that the element contained as a solid solution in nickel hydroxide was changed from manganese of Example 1 respectively to calcium, chromium and aluminum. The batteries obtained were respectively referred to as the Batteries D, E and F of the present invention, and were determined for the utilization rate in the same manner as in Example 1. The results obtained are shown in Table 3.

TABLE 3

|  | Utilization rate |
|---|---|
| Battery A | 142% |
| Battery D | 134% |
| Battery E | 132% |
| Battery F | 136% |

From Table 3, it was confirmed that good results near to the result obtained by using manganese can also be obtained when calcium, chromium and aluminum are used respectively in place of manganese. It was further confirmed that when manganese is used to form a solid solution, a better result, namely a higher utilization rate, is exhibited than in using other species of element.

Example 3

The preferred amount of manganese to be contained as a solid solution in nickel hydroxide was determined from the following investigation.

Batteries were prepared in the same manner as used for the battery A of the present invention except that 10 kinds of active materials obtained by changing the amount of manganese contained as a solid solution in nickel hydroxide to 0.1, 1, 3, 5, 7, 10, 13, 15, 17 and 20 mol %, respectively, were used for the positive electrode. The batteries were subjected to the same charge-discharge test as in Example 1, to obtain the results shown in FIG. 1.

FIG. 1 shows the capacity density of the positive electrode vs. the amount of manganese contained as a solid solution. It can be seen that a capacity of 700 mAh/cc or more, which is more than 15% higher than 600 mAh/cc of the prior art, is exhibited when the amount of manganese contained as a solid solution is in the range from not less than 3 mol % to not more than 15 mol %.

From the results described above, the amount of manganese to be contained as a solid solution in nickel hydroxide is preferably not less than 3 mol % and not more than 15 mol %. Further it was confirmed that calcium, aluminum and chromium also give approximately the same results, though somewhat differing in the utilization rate, and that these elements are preferably to be contained as a solid solution in the range from not less than 3 mol % to not more than 15 mol %.

Example 4

The following investigations were performed to determine the conditions of oxidation treatment in alkali.

Cobalt hydroxide was applied to the surface of spherical nickel hydroxide (containing 10 mol % of manganese as a solid solution in $Ni(OH)_2$) having an average particle diameter of 30 $\mu$m, which was one of the active materials of the present invention, in a proportion of 7 g per 100 g of the spherical nickel hydroxide by means of reaction-deposition, and the resulting particles were washed with water and dried.

Then the particles were mixed with a sodium hydroxide powder having a particle diameter of 100 $\mu$m or less and subjected to an oxidation treatment in the air under 8 kinds of temperature conditions of 50, 60, 70, 80, 100, 120, 130 and 150° C. for 2 hours.

Thereafter, batteries having the same structure as the battery A of the present invention except for using the materials obtained above were prepared and respectively subjected to the same charge-discharge test as in Example 1 to find that batteries using the materials oxidation-treated at a temperature not lower than 80° C. and not higher than 120° C. exhibited a good utilization rate.

Further, it was confirmed that similar results could be obtained also when the oxidation treatment was conducted at a temperature not lower than 80° C. and not higher than 120° C. while spraying aqueous sodium hydroxide solution upon the active material mixture.

Each of the 8 kinds of nickel hydroxide containing manganese as solid solution coated with cobalt oxyhydroxide prepared above was put into a non-conductive mold and, with application of a fixed pressure, subjected to determination with a common a.c. resistance meter. It was found that samples treated in the temperature range from not lower than 80° C. to not higher than 120° C. had a specific resistance of 15 $\Omega \cdot$cm or less and thus had a high electric conductivity. Samples treated at a temperature outside the range of 80–120° C. showed as high a specific resistance as 10 times or more. Since the specific resistance of nickel hydroxide containing manganese as a solid solution is six orders of magnitude or more higher, the above-mentioned determination was performed in disregard of the specific resistance. Also when cobalt hydroxide alone, in the absence of nickel hydroxide, was subjected to the alkali oxidation treatment, a similar result was obtained, whereby it was confirmed that the influence of nickel hydroxide containing manganese as a solid solution can be disregarded. Similar experiments were made also with other elements added as a solid solution and similar results were obtained.

As to the time of the oxidation treatment, a sufficient oxidation state can be obtained and a similar result can be obtained so long as the time is 30 minutes or more. A similar result is also obtained even when the time of oxidation treatment is as long as 240 hours. From these results, it is believed that the high-conductivity cobalt oxyhydroxide is stable and undergoes no more change in its oxidation state under the conditions of the present invention.

Then investigations were made on the species of alkali used in the oxidation treatment, and similar results to those described above could be obtained with lithium hydroxide and potassium hydroxide. Further, sodium hydroxide, lithium hydroxide and potassium hydroxide were mixed in various ratios and similar experiments were made with the respective mixtures. Consequently, similar results were obtained to those obtained when one kind of alkali was used.

On X-ray diffraction analysis, the high-conductivity cobalt oxyhydroxide was found to be longer in the c-axis direction than ordinary cobalt oxyhydroxide, which suggested that the former oxyhydroxide contained alkali cations, such as $Na^+$, $Li^+$ and $K^+$, in the interlayer spaces. The presence of such cations were confirmed by ICP analysis. Further, X-ray diffraction pattern was of very low intensity and broad, confirming that the compound had a low crystallinity.

Though nickel hydroxide containing manganese as a solid solution was coated with cobalt hydroxide by means of reaction-deposition in the present Example, similar results can be obtained also when the nickel hydroxide is coated with cobalt hydroxide by means of mechanical kneading, such as mechanofusion.

Although not shown in the above Examples of the present invention, the element to be contained in nickel hydroxide as a solid solution is not limited to one species. Similar results can also be obtained by using together at least two elements selected from the group consisting of manganese, aluminum, chromium and calcium.

The positive electrode for alkaline storage batteries of the present invention is a material intrinsically capable of attaining a high capacity density and can be effectively used not only together with negative electrodes of $AB_2$ type or $AB_5$ type hydrogen absorbing alloys shown in the Examples but also in combination with all of the other negative electrodes for alkaline storage batteries such as cadmium negative electrodes and zinc negative electrodes.

An invention which resembles the present invention has been disclosed in U.S. Pat. No. 5,523,182. Some comments are given below to clarify the difference between the present invention and that of the U.S. Pat. No. 5,523,182. The present invention basically differs from the above-mentioned invention in that at least one element selected from the group consisting of manganese, aluminum, chromium and calcium is contained as a solid solution in nickel hydroxide and that cobalt oxyhydroxide which has a very high electric conductivity of 15 Ω·cm or less and a low crystallinity is formed on the surface of the active material before the material is used to construct a battery. By forming a surface-coating layer before the construction of a battery, a surface layer which is strong and has a high electric conductivity can be obtained. Further, by using the cobalt oxyhydroxide which has a very high conductivity of 15 Ω·cm or less and has a low crystallinity, the rise of overvoltage at the last stage of discharge can be suppressed and discharge can be conducted to a state wherein the valence of Ni is 2.05 or less, in other words, discharge can be conducted to more depth. In contrast, cobalt oxyhydroxide obtained by using the prior oxidation technique, which does not contain alkali cations in the interlayer spaces and hence is not amorphous or in which oxidation conditions are mild and oxidation has not much proceeded, has a low electric conductivity and has much difficulty even in attaining 100 Ω·cm or less. Consequently, the positive electrode of the said invention is poor in the effect of decreasing the overvoltage attendant on charge and discharge, and permits only a shallow charge and discharge as compared with the positive electrode of the present invention.

As set forth above, according to the present invention, by coating the nickel oxide active material surface with a cobalt oxyhydroxide which has a high electric conductivity and a low crystallinity, the overvoltage in charge and discharge can be decreased and the utilization rate of the active material can be improved; at the same time, by incorporating at least one element selected from the group consisting of manganese, aluminum, chromium and calcium into nickel active material as a solid solution, γ-type nickel oxyhydroxide is imparted ability to discharge and thus the utilization rate of the active material can be improved.

The effects of the present invention not only includes the effect of attaining a high capacity by mere combination of two techniques but also includes the effect of improving the charge efficiency and thereby facilitating the formation of γ-type nickel oxyhydroxide. Thus, a high-capacity and long-life alkaline storage battery can be provided.

Furthermore, by attaining a higher capacity of the negative electrode by using a hydrogen absorbing alloy composed mainly of the C14 or C15 Laves phase comprising Zr and Ni as the main components and additionally at least one element selected from the group consisting of Mg, Ca, Ti, Hf, La, V, Nb, Ta, Cr, Mo, W, Mn, Fe, Co, Cu, Al and Si replacing a part of Zr and/or Ni, the capability to attain a higher capacity intrinsically possessed by the battery can be fully exhibited. Thus, an alkaline storage battery with a still higher capacity can be provided.

According to the present invention, it becomes possible to increase the capacity density of a battery as much as a maximum of about 40% as compared with prior art.

What is claimed is:

1. An alkaline storage battery which comprises a positive electrode comprising nickel oxide powder as the main active material, a negative electrode, a separator and an alkaline electrolyte,
   wherein the nickel oxide powder contains as a solid solution at least one element selected from the group consisting of manganese, aluminum, and chromium, and the surface and/or the vicinity of the surface of particles of said powder are coated with a material of high electric conductivity containing cobalt oxyhydroxide having a specific resistance of 15 Ω·cm or less and a low crystallinity.

2. An alkaline storage battery according to claim 1 wherein the at least one element selected from the group consisting of manganese, aluminum, and chromium is present in atotal amount of not less than 3% by mole and not more than 15% by mole relative to nickel.

3. An alkaline storage battery according to claim 1 wherein the nickel oxide powder contains manganese as a solid solution in an amount of not less than 3% by mole and not more than 15% by mole relative to nickel.

4. An alkaline storage battery according to claim 1 wherein the negative electrode comprises a hydrogen absorbing alloy comprising a C14 or C15 Laves phase in greatest part, the C14 or C15 Laves phase comprising Zr and Ni as the main components and additionally at least one element selected from the group consisting of Mg, Ca, Ti, Hf, V, La, Nb, Ta, Cr, Mo, W, Mn, Fe, Co, Cu, Al and Si replacing a part of Zr and/or Ni.

5. A process for preparing nickel oxide powder for use in an alkaline storage battery which comprises a positive electrode comprising said nickel oxide powder as the main active material, a negative electrode, a separator and an alkaline electrolyte,
   wherein the nickel oxide powder is prepared by a process comprising:
   (a) first synthesizing active material particles comprising a nickel oxide powder containing at least one element selected from the group consisting of manganese, aluminum, and chromium as a solid solution, and thereafter
   (b) coating a high-conductivity cobalt oxyhydroxide on the surface of the synthesized active material particles by a method comprising the steps of
      (i) applying a positive electrode additive comprising mainly divalent cobalt oxide to the surface and/or the vicinity of the surface of the active material particles by means of mechanical kneading or reaction-deposition,
      (ii) further adding a powder or an aqueous solution of at least one compound selected from the hydroxides of sodium, potassium and lithium to the particles resulting from step (i), and
      (iii) subjecting the resulting active material particles to an oxidation treatment in an oxidizing atmosphere at a temperature not lower than 80° C. and not higher than 120° C.

6. An alkaline storage battery according to claim 2 wherein the negative electrode comprises a hydrogen absorbing alloy comprising a C14 or C15 Laves phase in greatest part, the C14 or C15 Laves phase comprising Zr and Ni as the main components and additionally at least one element selected from the group consisting of Mg, Ca, Ti, Hf, V, La, Nb, Ta, Cr, Mo, W, Mn, Fe, Co, Cu, Al and Si replacing a part of Zr and/or Ni.

7. An alkaline storage battery according to claim 1, wherein said nickel oxide powder consists essentially of γ-type nickel oxyhydroxide in a charged state.

8. A process for producing an alkaline storage battery according to claim 5, wherein said nickel oxide powder consists essentially of γ-type nickel oxyhydroxide in a charged state.

* * * * *